United States Patent [19]

Mauer et al.

[11] 4,332,638

[45] Jun. 1, 1982

[54] METHOD AND APPARATUS FOR THE RECOVERY OF A SUSPENSION OF FIBROUS MATERIAL FROM MIXED WASTE PAPER

[75] Inventors: Eberhard Mauer; Siegbert Fischer; Lothar Pfalzer, all of Heidenheim, Fed. Rep. of Germany

[73] Assignee: J. M. Voith GmbH, Fed. Rep. of Germany

[21] Appl. No.: 125,890

[22] Filed: Mar. 3, 1980

[30] Foreign Application Priority Data

Mar. 6, 1979 [DE] Fed. Rep. of Germany ....... 2908660

[51] Int. Cl.³ ............................................. D21B 1/32
[52] U.S. Cl. ......................................... 162/4; 162/5; 162/6; 162/55; 209/3; 209/10; 209/17
[58] Field of Search .................... 209/3, 10, 7, 12, 17; 162/4, 5, 6, 55; 241/20, 21, 24, 28

[56] References Cited

U.S. PATENT DOCUMENTS

| | | | |
|---|---|---|---|
| 2,005,742 | 6/1935 | Hines | 162/5 |
| 3,791,917 | 2/1974 | Bolton | 162/55 |
| 3,925,150 | 12/1975 | Marsh | 162/4 |

FOREIGN PATENT DOCUMENTS

| | | | |
|---|---|---|---|
| 2818660 | 11/1978 | Fed. Rep. of Germany | 162/55 |
| 2836186 | 5/1979 | Fed. Rep. of Germany | 162/4 |

*Primary Examiner*—Ralph J. Hill
*Attorney, Agent, or Firm*—Ostrolenk, Faber, Gerb & Soffen

[57] ABSTRACT

The disclosure concerns a process and an apparatus for recovering fiber suspension from a mixture of different types of waste paper. The waste paper is disintegrated in a pulper to form a fiber suspension comprised of individual fibers. After perhaps passing a presorting device, the fiber suspension passes through a sorting device which separates the fibers into a long-fiber fraction and a short-fiber fraction. The two fractions are subsequently treated in different ways, generally for the purpose of cleaning the fiber fractions. Various treatment techniques are disclosed, including separating impurities from the long-fiber fraction by flotation and/or bleaching the long-fiber fraction and washing the short-fiber fraction and/or treating it by flotation for de-inking the short-fiber fraction and perhaps thereafter sorting the short-fiber fraction to remove impurities.

16 Claims, 3 Drawing Figures

METHOD AND APPARATUS FOR THE RECOVERY OF A SUSPENSION OF FIBROUS MATERIAL FROM MIXED WASTE PAPER

BACKGROUND OF THE INVENTION

This invention relates to a method and apparatus for the recovery of a suspension of fibrous material from mixed waste papers by first disintegrating the mixed papers into individual fibers, and then cleaning, floating and/or washing the separated fibers.

Waste paper consists of a mixture of many different types of paper. It includes, for instance, some paper which contains wood, other paper which is free of wood, unbleached kraft paper, cardboard, unbleached semi-chemical pulp and plastic-coated paper. Furthermore, the percentage of plastic-coated papers is increasing. Recovery of a suspension of fibrous material from this mixture of waste paper is difficult. Either a poor quality suspension is obtained or extensive and expensive paper treatment devices are necessary, which leads to high investment costs.

In German Provisional Patent (Auslegeschrift) No. 26 10 581, a method is described for obtaining relatively pure suspensions of fibrous material from waste paper, using a flotation device and a washing plant arranged one behind each other. If unbleached fibers, for instance, kraft papers and cardboards, are present, the fibers are also bleached in a bleaching tower. One disadvantage of this process and the plant for performing it is that it represents a considerable investment.

SUMMARY OF THE INVENTION

The object of the present invention, therefore, is to provide a process and a plant for the recovery of suspensions of fibrous material from mixed waste paper.

It is a further object to produce a suspension of fibrous material of relatively high purity and without excessively high investment costs.

According to the invention, the disintegrated individual fibers are separated into a long-fiber fraction and a short-fiber fraction. Then the two fractions are treated by being generally cleaned by being floated and/or washed in separate operations and possibly cleaned and bleached.

It has surprisingly been found that by first dividing the individual fibers into a short-fiber fraction and a long-fiber fraction, substantially better cleanliness of the entire suspension can be obtained, as compared with known methods and apparatus. There are several reasons for this. Unbleached kraft paper and cardboards of unbleached semi-chemical pulps primarily consist of long fibers. They are so-called mottled fibers, in that they impart an undesired shade to the fiber material which has been de-inked in the customary manner. Wood-containing waste paper cannot be subject to chlorine bleaching and furthermore comprises essentially short fibers. With the invention, the long-fiber mottled fibers can, for instance, be bleached separately due to their previous separation. Furthermore, chlorine can be used as a bleach, which in the presence of wood-containing fibers, would lead to yellowing of the suspension.

In addition, upon the removal of the short-fiber fraction from the suspension of fibrous material, of ash, (particles of filler), the broken fibers, fine substances, and the like are also removed. The removal of these particles, which is generally referred to as de-ashing, has heretofore also caused difficulties. These particles cannot be removed in an ordinary flotation plant. For this reason, it was proposed in German Provisional Patent (Auslegeschrift) No. 28 36 186 to provide a washing device for washing out these parts after treatment in the flotation plant.

In summary, it is advantageous in this connection for the short-fiber fraction to be washed and for the long-fiber fraction to be treated by flotation. In the event of the presence of mottled unbleached fibers in a noticeable quantity in the long-fiber fraction, it is advantageous for this fraction to be bleached.

By dividing the individual fibers in accordance with their length, pursuant to the present invention, the individual fiber fractions can now be treated in devices which are optimally adapted to their properties. Thus, for instance, the long fibers can be treated by flotation and possibly bleached, while the short fibers can be washed. Subsequent cleanings can also be adapted to the corresponding individual streams. Thus, for instance, the operating conditions of a hydrocyclone or the hole or slot width of a filtering screen can be of different shape or have a different size in the case of the short-fiber fraction than in the case of the long-fiber fraction. In this way, better fiber cleaning is obtained.

Another important advantage of the invention is that investment costs can be saved. For instance, in the apparatus in accordance with German Provisional Patent (Auslegeschrift) No. 26 10 581, the flotation device and the washing device must each be designed for passage of 100% of the substance. The washing and floating device, and possibly also the bleaching tower, according to the invention can now be designed for a correspondingly lower throughput (for instance for 50% of the substance each). These devices are correspondingly smaller and thus cheaper.

As already mentioned, by employing the invention, two streams of fibrous substance are obtained, one having a high percentage of long fibers and a small amount of ash and another having a high percentage of short fibers and a large amount of ash. The low-ash long-fiber suspension is best treated by flotation, while the high-ash short-fiber suspension is, in general, better washed. In this connection, in addition to the printing ink, a large part of the ash and fine substances is removed.

The two streams of fractions of suspension can be thereafter combined again and the resulting thin consistency pulp suspension may be cleaned. Alternatively, each individual stream of suspension may be advantageously cleaned by itself in accordance with its special conditions, and thereafter the two streams may be combined again for their joint further treatment.

The method of the invention has the advantage that in the case of ash containing paper, the apparatus of the invention, which is necessary for ash removal, can also be used for de-inking. For this, it is merely necessary for the flotation agent to already be introduced into the customary pulper and for the flotation agent to be suitable both for the flotation process and for the washing process. If necessary, however, it is also possible to briefly use different chemicals directly before operating with the flotation or washing apparatus.

If unbleached fibers are present in noticeable quantity in the long-fiber fraction, bleaching can be effected either before the flotation apparatus or, preferably, after it.

One embodiment of the apparatus in accordance with the invention has a pulper, a flotation and/or washing device, a bleaching tower and cleaning and sorting devices. After the pulper for the joint pulping of all the waste paper and after the joint flotation device, there is a sorting device in which a short-fiber fraction and a long-fiber fraction are separated. The outlet conduit for the long-fiber fraction from the sorting device leads to a bleaching tower.

Another embodiment of apparatus according to the invention has a sorting device that follows the pulper. In the sorting device, the suspension is separated into a long-fiber fraction and a short-fiber fraction. The conduit for the discharge of the long-fiber fraction from the sorting device leads to a flotation device, while the conduit for the discharge of the short-fiber fraction from the sorting device leads to a washing device.

The long-fiber fraction can be treated by flotation in a traditional manner with suitable chemicals, while the short-fiber fraction is washed out, also in the presence of chemicals. De-ashing of the short-fiber fraction is simultaneously obtained.

If unbleached fibers are still present in noticeable quantities, the long-fiber fraction can be fed to a bleaching tower located before or after the above mentioned washing or flotation device. If unbleached fibers are also present in the short-fiber fraction, then, with due consideration of the properties of the suspension (for instance mechanical wood pulp), a bleaching with an appropriate bleaching substance can be performed on this stream of fiber fraction. on this stream of fiber fraction.

Various illustrative embodiments of the invention are described below with reference to the drawings.

DESCRIPTION OF THE PREFERRED EMBODIMENTS

Figure 1:
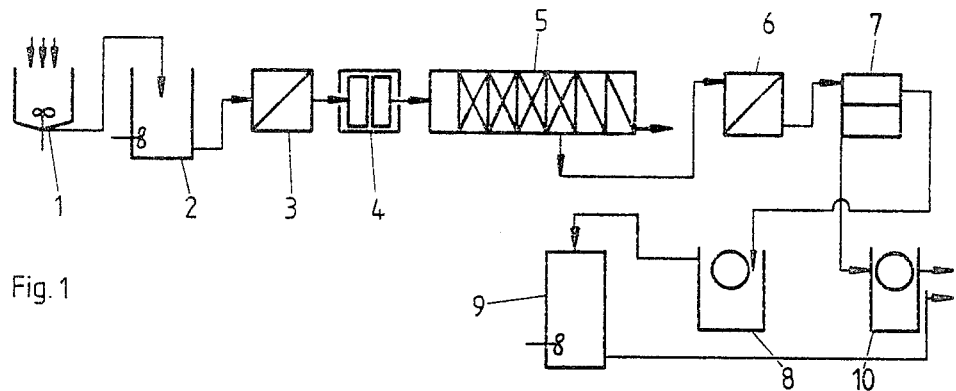
FIG. 1 shows one embodiment of apparatus in accordance with the invention for use with unbleached fibers.

Waste paper, water and the customary pulping and de-inking chemicals known in the art, for instance, sodium hydroxide and alkyl sulfonite or soap, e.g. sodium soap, as shown in U.S. Pat. No. 3,354,028, incorporated herein by reference, are introduced in a customary manner into a pulper 1 of the type shown in U.S. Pat. Nos. 3,722,832 or 3,595,488 or in the prospectus of the J. M. Voith Gmbh, No. 2147e, published May 1975 and entitled "AP Pulper and ATS Turbo Separator" all incorporated herein by reference. As shown in FIG. 1, the pulper is followed by an intermediate storage vat 2.

After being stored in the vat, the pulp suspension has a thick consistency and from the vat, it is delivered for a pre-cleaning to a sorting device 3 of the type shown, for example, in GB-PS No. 900,696 and U.S. Pat. No. 3,092,578, both incorporated herein by reference. The sorting device may comprise, for instance, a vertical sorter and/or a hydrocyclone. The purpose of the sorting device 3 is preliminary cleaning or purification, removal of rough contaminants, like heavy dirt particles, to produce from the pulp at pulp consistencies in the range of 1.5 to 5–6%.

Following the sorting device 3, there is a speck-remover device 4 of the type shown in U.S. Pat. No. 3,745,645 or in "Paper Technology, Vol. 8, No. 3, pages 270–277 (1967), both incorporated herein by reference, for accomplishing another fiber pulping.

This is, in turn followed by flotation apparatus 5 of the type shown in U.S. Pat. No. 2,005,742, incorporated herein by reference. Actually, a plurality of these apparatus are typically connected in series. In the flotation apparatus, the contaminants, such as ink and dirt particles, float away from the fiber suspension and the remaining suspension is ready for further treatment. The flotation apparatus 5 is, in turn, followed by another sorting device 6 of the type shown in DT-AS No. 2,712,715, incorporated herein by reference, and which performs the same function as the sorting device 3.

From the sorting device 6, the fiber suspension passes into yet another sorting device 7, of the type shown in DT-AS No. 1,483,497 (FIG. 18) or DT-AS No. 2,014,700, both incorporated herein by reference, in which separation of the long fibers from the short fibers of the fiber suspension takes place. For this purpose, sorting device 7 can be, for instance, a vertical sorter having a cylindrically shaped screen basket. The slot size or hole width of the screen basket is so selected that the desired separation of the fibers takes place.

The short-fiber fraction passes together with the ash and fiber fragments through the screen, and settles below it while the long-fiber fraction remains on the screen.

The long-fiber fraction, which contains a high percentage of unbleached fibers, is conducted to a thickener 8, of any of the types shown in "Paper Technology", Vol. 8, No. 3, pp. 270–277 (1967). From there, it passes into a bleaching tower, which may be any of the known types like that shown in U.S. Pat. No. 3,622,441 or 2,166,200. Within the bleaching tower 9, bleaching (for instance chlorine bleaching) and particularly using active chlorine as a bleaching agent in a concentration of 0.3 to 1.5 ( . . . 2% as maximum value occasionally), is effected for from one to three hours in the case of pulp densities of 5 to 20%, at a temperature of 30° to 60° C.

After leaving the sorting device 7, the short-fiber fraction enters a thickener 10, of the same type as the thickener 8, in which the pulp is washed out.

The two individual streams of suspension can then be combined again in means, not shown, and be fed to a paper making machine, not shown, or to some other processing step.

Figure 2:
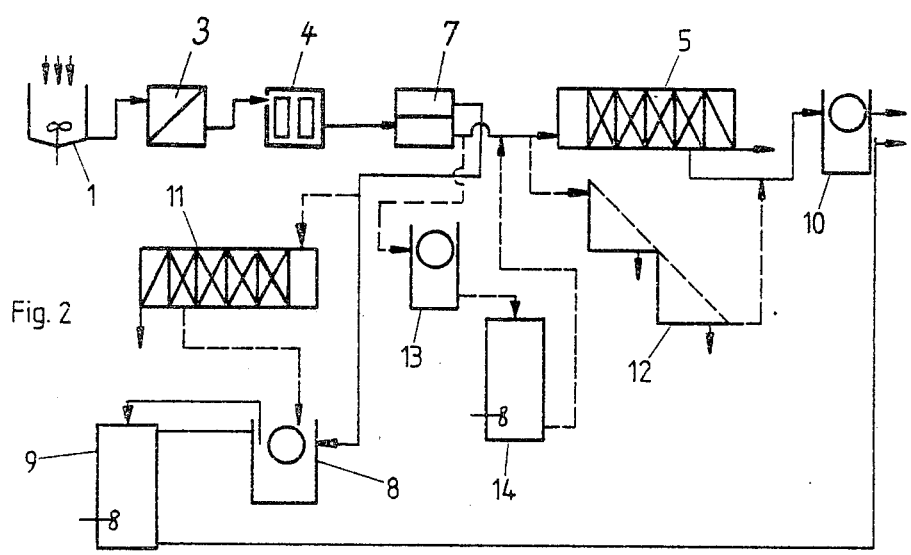
FIG. 2 shows another embodiment of apparatus according to the invention for use with unbleached fibers.

In the embodiment of FIG. 2, the division into a short-fiber fraction and a long-fiber fraction takes place before the flotation plant 5, rather than afterward. The sorting device 7 for separating the long-fiber fraction and the short-fiber fraction is here arranged after the sorting device 3. The long-fiber fraction passes again into the bleaching tower 9 after it has been thickened in the thickener 8.

If, in addition to mottled fibers, noticeable quantities of fibers with printing ink are also present, then a flotation apparatus 11, of the same type as flotation apparatus 5, can be interposed before the bleaching tower for de-inking of the long-fiber fraction.

The short-fiber fraction after next being pulped further in the de-specking device 4 then it enters the flotation apparatus 5. The discharge conduit from the apparatus 5 again extends to the thickener 10. If it is desired to effect a greater degree of de-ashing, for producing a suspension useful in producing toilet papers, for example, then, instead of the flotation apparatus 5, there can also be used, as indicated in dashed line, a washing device, for instance an oblique screen 12 of the type shown in U.S. Pat. No. 3,477,571. Additionally to the de-specking device 4, it is possible to provide a thickener 13, of the same type as the thickener 8, which thickens the consistency of the pulp suspension. After the thickener 13, the pulp suspension passes into a tower 14, of the type shown in U.S. Pat. No. 3,622,441 or 2,166,200. In the tower 14, both further pulping takes place and a chemical treatment for the bleaching of the fibers, of the type described above. After suitable redilution in the tower 14 to a concentration 1–2% stock consistency in the case of flotation and 1–4% stock consistency in the case of washing, the bleached suspension can also be fed to the flotation plant 5 or to the washing device 12.

Figure 3:
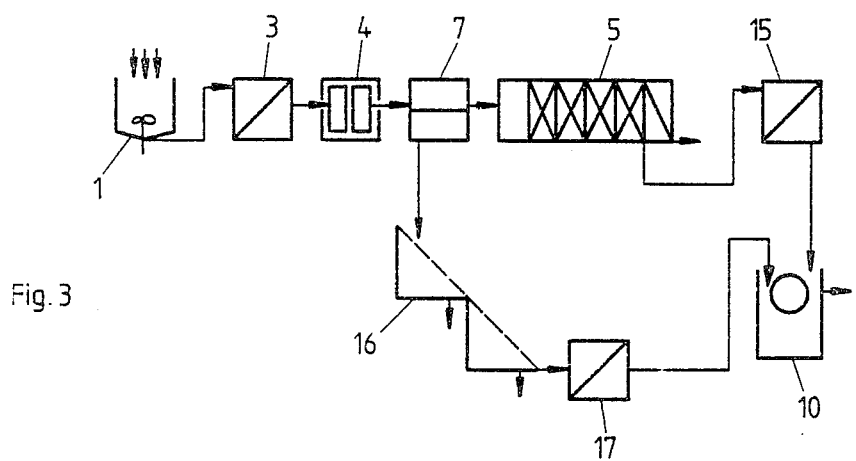
FIG. 3 shows yet another embodiment of apparatus according to the invention with de-ashing capability.

FIG. 3 shows another embodiment of simpler construction for the removal of ash. The separating device 7 for separating suspension into a short-fiber fraction and a long-fiber fraction is arranged after the sorting device 3 and the de-specking device 4.

The long-fiber fraction is de-inked in the flotation apparatus 5 and its consistency is also thinned. The thinner consistency long fiber fraction is then cleaned further in the sorting device 15, similar to the above described sorting device 6, but which is specifically adapted to the long fibers. See DT-AS No. 1,483,497 (FIG. 18) or DT-AS No. 2,014,700, both incorporated herein by reference. Then this part of the suspension passes into a thickener 10.

The short-fiber fraction passes from the sorting device 7 to a washing device 16 which is like the washing device 12. Within the washing device 16, removal of ash and the removal of fiber fragments occur at the same time as the removal of printer's ink. The consistency of the short fiber fraction is thinned. Following the washing device 16, the short fiber fraction passes into a sorting device 17 of the same type as the device 6, and then it also passes into the thickener 10 for joint further processing of both fractions.

Although the present invention has been described in connection with several preferred embodiments thereof, many variations and modifications will now become apparent to those skilled in the art. It is preferred, therefore, that the present invention be limited not by the specific disclosure herein, but only by the appended claims.

What is claimed is:

1. Method for recovery of a fiber suspension from mixed waste paper which includes ink containing fibers, comprising the steps of:
   separating said fibers into a long-fiber fraction and a short-fiber fration;
   treating said separated fiber fractions in separate and substantially different deinking operations for generally deinking and cleaning said fiber fractions; and thereafter
   combining said separately cleaned fiber fractions to form a slurry of deinked waste paper.

2. The process of claim 1, wherein the short-fiber fraction is treated by being washed.

3. The process of claim 1, wherein the long-fiber fraction is treated by flotation for separating the impurities from the fibers and for floating off the impurities.

4. The process of claim 3, wherein the short-fiber fraction is treated by being washed.

5. The process of either of claims 3 or 4, wherein for treatment of any unbleached fibers in the long-fiber fraction, the long-fiber fraction is bleached.

6. Apparatus for recovery of a fiber suspension from mixed waste paper which includes ink containing fibers, comprising:
   a pulper for disintegrating the mixed waste paper into a fiber suspension of individual fibers;
   separating means for separating said fibers in the suspension into a long-fiber fraction and a short-fiber fraction;
   respective treatment means for separately treating each of the separated long-fiber fraction and short-fiber fraction for generally deinking and cleaning said respective separate fiber fractions, said respective treatment means subjecting said long and short fiber suspensions to substantially different deinking operations; and
   means for combining said separately cleaned fiber fractions to form a slurry of deinked waste paper.

7. The apparatus of claim 6, further comprising a common flotation device receiving said pulped fiber suspension for separating impurities from the pulped fiber suspension by floating off the impurities from the fibers; and transmitting means for transmitting the suspension from said flotation device to said separating means.

8. The apparatus of claim 7, wherein the treatment means for the long-fiber fraction comprises a bleaching tower for bleaching fibers in the bleaching tower.

9. The apparatus of claim 6, wherein the treatment means for the long-fiber fraction comprises a bleaching tower for bleaching fibers in the bleaching tower.

10. The apparatus of either of claims 6 or 9, wherein the treatment means for the short-fiber fraction comprises a flotation device for de-inking the short-fiber fraction by separating impurities and ink from the fibers of the short-fiber fraction and floating off the impurities and ink.

11. The apparatus of claim 10, further comprising a presorting device for initial cleaning and for removal of rough contaminants and heavy particles, the presorting device being located after the pulper and before the separating means.

12. The apparatus of either of claims 6 or 9, wherein the treatment means for the short-fiber fraction comprises a washing device for washing the fibers of that fraction.

13. The apparatus of claim 12, further comprising a presorting device for accomplishing cleaning and for removal of rough contaminants and heavy particles, the presorting device being located after the pulper and before the separating means.

14. The apparatus of claim 6, wherein the treatment means for the long-fiber fraction comprises a flotation device for floating impurities off the fibers of the long-fiber fraction in the flotation device.

15. The apparatus of either of claims 6 or 14, wherein the treatment means for the short-fiber fraction comprises a washing device for washing the short-fiber fraction and comprises a sorting device after the washing device.

16. The apparatus of claim 15, further comprising a presorting device for accomplishing cleaning and for removal of rought contaminants and heavy articles, the presorting device being located after the pulper and before the separating means.

* * * * *